US006938091B2

(12) United States Patent
Das Sharma

(10) Patent No.: US 6,938,091 B2
(45) Date of Patent: Aug. 30, 2005

(54) STATIC END TO END RETRANSMIT APPARATUS AND METHOD

(75) Inventor: Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 10/092,501

(22) Filed: Mar. 8, 2002

(65) Prior Publication Data

US 2003/0172181 A1 Sep. 11, 2003

(51) Int. Cl.[7] .......................... G06F 15/16; G06F 12/00; G08C 25/02; H03H 7/40; G11B 5/09
(52) U.S. Cl. ........................ 709/230; 714/748; 711/138; 375/232; 370/227; 369/47.25
(58) Field of Search ........................ 709/230; 714/748; 711/138; 375/232; 370/227; 369/47.25

(56) References Cited

U.S. PATENT DOCUMENTS

| 4,799,215 | A | * | 1/1989 | Suzuki ........................ 370/227 |
|---|---|---|---|---|
| 5,257,359 | A | * | 10/1993 | Blasco et al. ................ 711/138 |
| 5,673,252 | A | * | 9/1997 | Johnson et al. .............. 370/449 |
| 6,266,337 | B1 | * | 7/2001 | Marco ........................ 370/410 |
| 6,272,148 | B1 | * | 8/2001 | Takagi et al. ................ 370/469 |
| 6,324,582 | B1 | * | 11/2001 | Sridhar et al. ............... 709/230 |
| 6,587,985 | B1 | * | 7/2003 | Fukushima et al. ......... 714/748 |
| 6,678,224 | B2 | * | 1/2004 | Yamashita et al. ........ 369/47.25 |
| 2002/0069388 | A1 | * | 6/2002 | Niu et al. .................... 714/748 |

OTHER PUBLICATIONS

Papadopoulos et al., An error Control Scheme for LArge-Scale Multicast Applications, May, 1997, Dept. of Computer Science, Washington University.*

Parikh et al., Proposed mechanism for L2TP Failover Handling, May 2001, ☐☐http://www.watersprings.org/pub/id/draft−parikh−l2tpext−tailover−00.txt.*

Estrin et al., Routing Support for RSVP, Jun. 30, 1995.*

* cited by examiner

Primary Examiner—Beatriz Prieto
Assistant Examiner—Kelvin Lin

(57) ABSTRACT

In a multiprocessor computer system with multiple nodes, a static end to end retry apparatus and method uses the concept of sequence numbers combined with a path number. All transactions sent along a path are delivered in order to remove any time dependency. The apparatus and method ensure there are no duplicate transactions through the use of special probe and plunge transactions and their respective responses. The apparatus and method also allow for any number of alternate paths being active simultaneously, such that if one path fails, the remaining alternate paths can continue on the communication (along with the backup alternate path if desired) as usual without any loss of transactions. Each node keeps track of transactions the node has sent over time to every other node, as well as every transaction the node has received from every other node along each active path for each flow control class. To accomplish this tracking function, two data structures exist. A send_seqid, representing the sequence identification (ID) (or sequence number) for the last transaction sent by the sending (or source) node to a given destination node exists along any given active path, and a flow control class. A second structure is a receive_seqid, representing the sequence ID (sequence number) of the last transaction that a destination node received and for which the destination node sent an acknowledgement (ACK) back to the source node, for each node, along every active path, and for each flow control class. The send_seqid and the receive_seqid may be stored in send_seqid and receive_seqid tables at each node in the multiprocessor computer system.

21 Claims, 8 Drawing Sheets

| SEQUENCE NUMBER NODE,PATH,FLOW CONTROL CLASS | FLAG BIT |   |
|---|---|---|
|  |  | — 0 |
|  |  | — 1 |
|  |  | — 2 |
|  |  | — 3 |
|  |  | — 4 |
|  |  | — 5 |
|  |  | — 6 |
| ⋮ | ⋮ | ⋮ |
|  |  | 12 |
|  |  | 13 |
|  |  | 14 |
|  |  | 15 |

*FIG. 3*

STATIC END TO END RETRANSMIT APPARATUS AND METHOD

TECHNICAL FIELD

The technical field is error detection and correction in multiprocessor computer systems.

BACKGROUND

Path or link errors may exist in multiprocessor computer systems. To tolerate such link errors, computer designers have traditionally made use of error correction code (ECC) or retry mechanisms. ECC handles certain permanent errors such as a wire being disconnected in a link (or interconnect) while other links are working. However, if multiple wires in the link are disconnected, or if the entire link is disconnected, the ECC cannot recover the disconnected link. Retry works well for transient errors. If a packet includes errors that can be detected, but not corrected, then the packet will be sent again from a sending node to a receiving node using the same link. The process of sending the packet may repeat several times. However, retry cannot handle errors such as multiple wires failing in a link or the link being disconnected, or an intermediate routing chip being removed for service.

An end to end retry scheme may be used as a means to tolerate link or immediate route chip failures. The basic approach is that each transaction has a time to live, and as a transaction travels through the multiprocessor computer architecture, the value of the time to live is decremented. A transaction that cannot be delivered to its destination node and has its time to live go from its maximum level to zero is discarded. Request transactions may be retried along a secondary path if some predetermined number of attempts along the primary path failed to generate a response. Response transactions may not be acknowledged. If a response transaction does not reach its destination mode, the failure of the response transaction to reach the destination node will have the same effect as a request transaction not reaching the destination mode, and as a result the request transaction may be retried.

This end-to-end retry scheme has several disadvantages. First, is that the time-out hierarchy is tied to the retry protocol. If a request transaction is tried four times, for example, (along primary and alternate paths) before the request reaches an error time out, then the next transaction type in the hierarchy has to wait for four times the time out for every lower level transaction, the transaction type can generate. For example, a memory read request may cause several recalls. Thus, the memory read request may be reissued only after allowing all recalls to happen. Thus, the memory read request's reissue time out is the maximum number of recalls times the four times the recall time out, plus the times of flight for the request transaction and the response transaction. As a result, the time out hierarchy keeps increasing exponentially (that is the factor four keeps getting multiplied across the hierarchy).

A second disadvantage is that verifying a time out hierarchy is a challenging design requirement since time outs frequently take place over the period of time measured in seconds, and simulating a large system to the range of seconds of operation is almost impossible. A third disadvantage is that the retry strategy requires participation of all chips in the interconnect (at least to decrement the time out value). Thus, the retry strategy does not work well in a computer architecture that has components, such as a crossbar, that the computer designer is trying to leverage that is oblivious to the recovery features such as time to live. A fourth disadvantage is that the retry strategy operates in an unordered network, and ordered transactions such as processor input/outputs (PIOs) need an explicit series of sequence numbers to guarantee ordering. In addition, for transactions such as PIO reads that have side effects, a read return cache is needed to ensure the same PIO read is not forwarded to a PCI bus multiple times.

SUMMARY

A static end to end retry apparatus and method uses the concept of sequence numbers combined with a path number. All transactions sent along a path are delivered in order to remove any time dependency. The apparatus and method ensure there are no duplicate transactions through the use of special probe and plunge transactions and their respective responses. The apparatus and method also allow for any number of alternate paths being active simultaneously, such that if one path fails, the remaining alternate paths can continue on the communication (along with the backup alternate path if desired) as usual without any loss of transactions.

In a multiprocessor computer system with multiple nodes, each node keeps track of transactions the node has sent over time to every other node, as well as every transaction the node has received from every other node along each active path for each flow control class. To accomplish this tracking function, two data structures exist. A send_seqid, representing the sequence identification (ID) (or sequence number) for the last transaction sent by the sending (or source) node to a given destination node exists along any given active path, and a flow control class. A second structure is a receive_seqid, representing the sequence ID (sequence number) of the last transaction that a destination node received and for which the destination node sent an acknowledgement (ACK) back to the source node, for each node, along every active path, and for each flow control class. The send_seqid and the receive_seqid may be stored in send_seqid and receive_seqid tables at each node in the multiprocessor computer system.

Each node (destination node for the send_sequid or source node for the receive_sequid) can receive transactions over multiple paths. All nodes in one flow control class may operate over the same number of paths. For example, the system may have four alternate active paths between any two CPU/memory nodes, but only one active path to or from an I/O hub chip. The system does not require distinct physical paths between any source-destination nodes. For example, the system may comprise four active paths with two active paths sharing a physical path.

Every transaction that is sent from a source node to a destination node is also put into a retransmit buffer. When the transaction results in an acknowledgement from the destination node, the transaction is removed from the retransmit buffer. The acknowledgement can be piggy-backed with an incoming transaction and/or a special transaction. No acknowledgement is necessary for an acknowledgement transaction. If a transaction is not acknowledged within a predetermined time, recovery actions are taken. The destination node may wait to gather several transactions for a given source node before generating an explicit acknowledgement transaction, while trying to ensure that such a delay will not generate any recovery actions at the source node. This delay helps conserve bandwidth by avoiding explicit acknowledgement transactions as much as possible.

When a source node sends a transaction to a destination node, the source node gets the sequence number from the send_seqid table, checks that no transaction with the source sequence number is pending to the same destination node, and sends the transaction to the destination node while also sending the transaction to the retransmit buffer. The source node then increments the corresponding sequence number in the send_seqid table. When the destination node receives the transaction, the destination node queues the transaction in a destination node buffer. If the transaction is of a request type, and the destination node can generate a response within a time out period, the destination node sends a response, which acts as in implicit acknowledgement, to the source node. The destination node checks the receive_seqid table to see if the transaction received by the destination node has the correct sequence number. If the transaction has the correct sequence number, the destination node updates the corresponding entry in the receive_seqid table, and sets a flag bit indicating that the destination node needs to send an acknowledgement transaction. If the transaction does not have a correct sequence number, the transaction is dropped, since an incorrect sequence number means that earlier transactions have been dropped in the system. If the destination node cannot generate a response (or the transaction is a response transaction) the destination node simply sends an acknowledgement transaction to the source node. In either case, the destination node resets the flag bit in the receive_seqid table indicating that the acknowledgement (or response) has been sent. The destination node sends acknowledgement transactions for transactions received from a particular node, path and flow control class, in order.

If a source node does not receive an acknowledgement transaction within a predetermined time, the source node sends a probe request transaction along an alternate path (preferably an alternate physical path). The probe request transaction contains the source node identification, the path number, the flow control class, the sequence number of the timed-out transaction, and the sequence number of the last transaction that is pending. The destination node takes the information contained in the probe request transaction and determines if the destination node has already responded to the timed-out transaction. If the destination node has already responded to the timed-out transaction, the destination node indicates so in a probe request response along with the sequence number of the last transaction that the destination node has received. This probe request response is sent along an alternate path. The probe request transaction, as well as the corresponding probe request response, may then be used for acknowledgement purposes. When the source node receives acknowledgement to the probe request transaction, the source node resumes retransmission starting with the transaction after the last sequence number received by the destination node, if any. From this point on, neither the source node nor the destination node use the path where the problem occurred to receive a transaction or to send out an acknowledgement.

DESCRIPTION OF THE DRAWINGS

The detailed description will refer to the following figures, in which like numbers refer to like elements, and in which:

FIG. 3 illustrates a sequence identification table used with the apparatus of FIG. 1.

DETAILED DESCRIPTION

Figure 1:
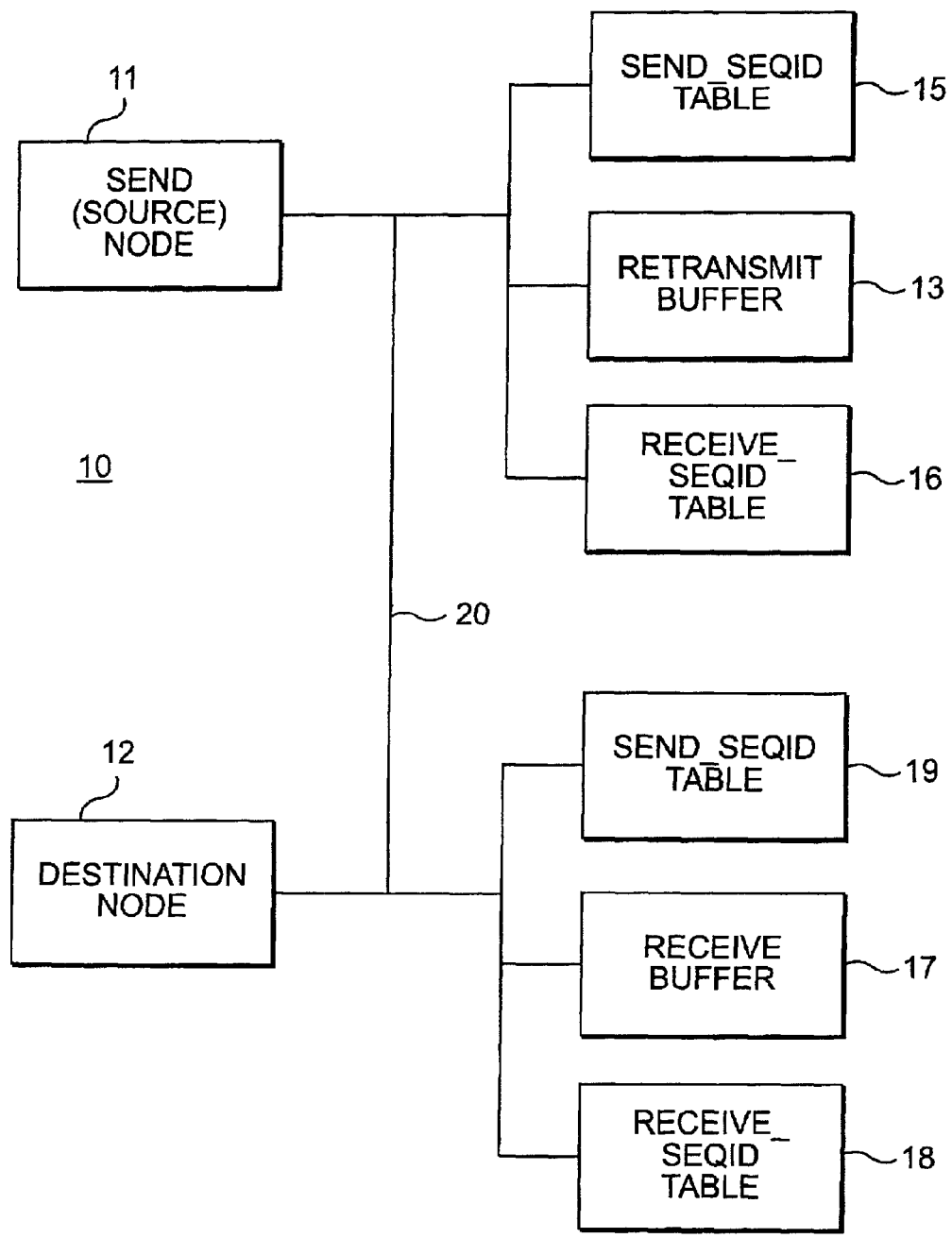
FIG. 1 is a diagram of a multiprocessor computer system that employs a static end to end retransmit apparatus and method.

A static end to end retransmit protocol is implemented by an end to end retransmit apparatus and method employed in a multiprocessor computer system. FIG. 1 is a block diagram of a multiprocessor computer system 10 that employs such an apparatus. In FIG. 1, a source node 11 is coupled to a destination node 12 through alternate paths 20. The source node 11 is also coupled to a retransmit buffer 13 and a send_seqid table 15 and a receive_seqid table 16. The destination node 12 is coupled to a receive buffer 17 and a receive_seqid table 18 and a send_seqid table 19. The designation of the nodes 11 and 12 is arbitrary, and for means of illustration. In the system 10, both the nodes 11 and 12 may send and receive transactions and hence both the nodes 11 and 12 may be any source or destination nodes. The nodes 11 and 12 may be any nodes in the multiprocessor computer system 10, such as CPU or memory nodes or I/O hub chips. The paths 20 may be distinct physical paths or virtual paths. The source node 11 sends transactions to the destination node 12 along one of the physical paths 20 and receives responses or acknowledgements from the destination node 12 along one of the physical paths 20. Transmissions sent from the source node 11 to the destination node 12 may be temporarily placed in the retransmit buffer 13. Similarly, responses and acknowledgements from the destination node 12 to the source node 11 may be temporarily placed in the receive buffer 17. The send_seqid tables 15 and 19 and the receive_seqid tables 16 and 18 may be used to store information related to the transactions such as the sequence number (or sequence ID) of each transaction, response or acknowledgement.

Figure 2:
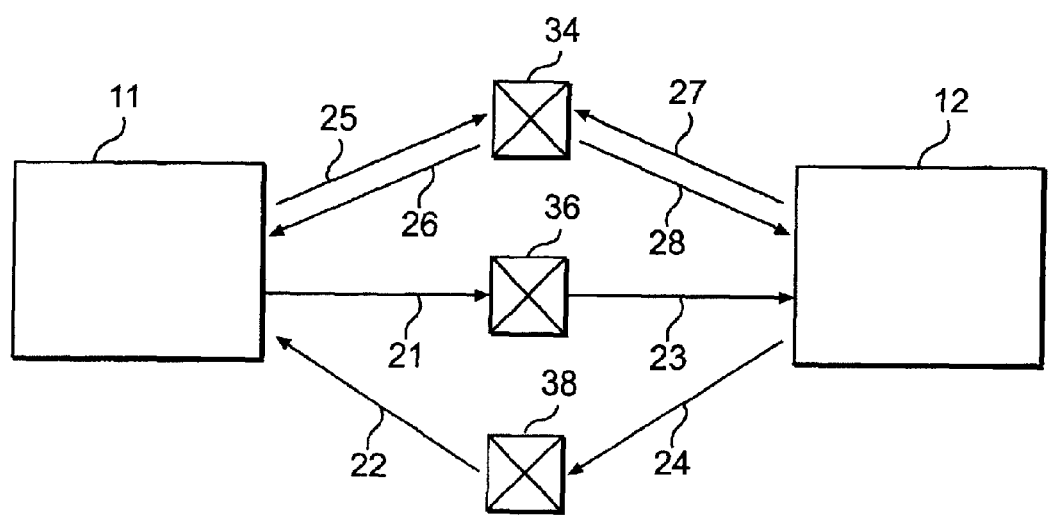
FIG. 2 is a further block diagram of a system of FIG. 1.

FIG. 2 is a block diagram of the microprocessor computer system 10 of FIG. 1 showing additional details of operation of the end to end retransmit apparatus. The nodes 11 and 12 are connected through a number of cross-bar type routing chips. In the illustrated example, the cross-bar chips 34, 36, and 38 are used to connect the nodes 11 and 12. However, fewer or more cross-bar chips could be used.

The nodes 11 and 12 are connected by two paths, P1 and P2. The path P1 is designated by links 21–24. The path P2 is designated by links 25–28. Any of the links 21–28 in the paths P1 and P2 may fail. For example, the link 28 (in path P2 from the source node 11 to the destination node 12) may fail. Thereafter, any transaction the source node 11 sends (or has sent) to the destination node 12 over the link 28 and the path P2 not arrive at the destination node 12, and hence will not be acknowledged by the destination node 12. The source node 11 will eventually time out on the oldest non-acknowledged transaction. The source node 11 will thenceforth stop using the path P2 for sending any subsequent normal transactions. In particular, the source node 11 will deconfigure the path P2 and will stop accepting any acknowledgements that are sent to the source node 11 over the path P2. However, the source node 11 may continue to receive normal transactions over the path P2. The source node 11 may also send a probe request along the path P1, for example, over the links 21 and 23. The destination node 12 may respond, using the path P1, with the sequence number of the last transaction received by the destination node 12 from the source node 11 over the path P2. The destination node 12 then stops receiving any normal transactions along the path P2. The deconfigured path P2 may be indicated by use of a separate status bit, or by simply reserving a sequence number (for example, all 0's).

The source node 11 may attempt to determine if the failed path P2 is still open. For example, the unacknowledged transaction may have been the result of a transient error, in which case the path P2 may still be available for sending and receiving transactions, including acknowledgements. After receiving the response to the probe request, the source node 11 may send a plunge request along the failed path P2 and flow control class to the destination node 12. The plunge request indicates the sequence number of the first transaction the source node 11 will retransmit if the path P2 is re-established. On receiving the plunge request, the destination node 12 may re-establish the path P2. The destination node 12 then initiates a response for the plunge request. Since the plunge request itself may be in the response flow control class, the destination node 12 may use a flag bit in the receive_seqid table 18 to send the plunge request response when space exists in the receive buffer 17. Once the source node 11 receives the response to the plunge request, the source node 11 can start using the path P2 for normal transactions. If the source node 11 does not receive a response to the plunge request, the source node 11 does not use the path P2 until maintenance software guarantees that the path P2 has been re-established. In an embodiment, the source node 11 may retry the determination of the existence of the path P2 by periodically sending plunge requests to the destination node 12.

In the multiprocessor computer system 10 shown in FIGS. 1 and 2, each of the nodes 11 and 12 keeps track of transactions the node has sent over time to the other node, as well as every transaction the node has received from the other node, along each active path for each flow control class. To accomplish this tracking function, two data structures exist. A send_seqid, represents the sequence number (sequence ID) for the last transaction sent by the source node 11 to the destination node 12 along any given active path and for each flow control class. A receive_seqid represents the sequence number of the last transaction that the destination node 12 received and for which the destination node 12 sent an acknowledgement (ACK) back to the source node 11, for each node, along the active path, and for each flow control class. Each node (destination node 12 for send_seqid or source node 11 for receive_seqid) can operate over multiple paths. All nodes in one full control class may operate over the same number of paths. For example, the system 10 may have four alternate active paths between any two CPU/memory nodes, but one active path to or from an I/O hub chip. The system 10 does not require distinct physical paths between any source-destination nodes. For example, the system 10 may comprise four active paths with two active paths sharing a physical path.

The flow control class refers to the type of transactions being sent over the paths/links in the system 10. For example, a memory read request may be in flow control class A and a write request in flow control class B. A path that is available to one flow control class may not be available to different flow control class.

Every transaction that is sent from the source node 11 to the destination node 12 is also put into the retransmit buffer 13. When the transaction gets an acknowledgement from the destination node 12, the transaction is removed from the retransmit buffer 13. The acknowledgement can be piggy-backed with an incoming transaction and/or a special transaction. No acknowledgement is necessary for an acknowledgement transaction. If a transaction does not get an acknowledgement within a predetermined time, recovery actions may be taken. The destination node 12 may wait to gather several transactions for a given source node 11 before generating an explicit acknowledgement transaction, while trying to ensure that such a delay will not generate any recovery actions at the source node 11. This delay helps conserve bandwidth by avoiding explicit acknowledgement transactions as much as possible.

When the source node 11 sends a transaction to a destination node 12, the source node 11 gets the sequence number from the send_seqid table 15, checks that the transaction with the sequence number is pending to the same destination node 12, and sends the transaction to the destination node 12 while placing the transaction in the retransmit buffer 13. The source node 11 then increments the corresponding sequence number in the send_seqid table 15. When the destination node 12 receives the transaction, the destination node 12 queues the transaction in the receive buffer 17. If the transaction is of a request type, and the destination node 12 can generate a response within the time out period, the destination node 12 sends a response to the source node 11, which acts as an implicit acknowledgement. The destination node 12 then checks the receive_seqid table 18 to see if the transaction the destination node 12 received has the correct sequence number. If the transaction has the correct sequence number, the destination node 12 updates the corresponding entry in the receive_seqid table 18, and sets a flag bit indicating that the destination node 12 needs to send an acknowledgement transaction. If the transaction does not have a correct sequence number, the transaction is dropped, since an incorrect sequence number means that earlier transactions have been dropped in the system 10. If the destination node 12 cannot generate a response (or the transaction is a response transaction) the destination node 12 simply sends an acknowledgement transaction to the source node 11. In either case, the destination node 12 resets the flag bit in the receive_seqid table 18 indicating that the acknowledgement (or response) has been sent. The destination node 12 sends the acknowledgment for all transactions received from the source node 11, along a given active path, and flow control class, in order.

If the source node 11 does not receive an acknowledgement transaction within a predetermined time, the source node 11 sends a probe request transaction along an alternate path (preferably an alternate physical path). The probe request transaction contains the source node identification, the path number, the flow control class, and the sequence ID of the timed-out transaction, and the sequence number of the last transaction that is pending in the retransmit buffer 13. The destination node 12 takes the information contained in the probe request transaction and determines if the destination node 12 has already responded to the timed-out transaction. If the destination node 12 has already responded to the timed-out transaction, the destination node 12 indicates so in a probe request response along with the sequence number of the last transaction which the destination node 12 has received. The probe request response is sent along an alternate path. The probe request transaction, as well as the corresponding probe request response, may then be used for acknowledgement purposes. When the source node receives acknowledgement to the probe request transaction, the source node resumes retransmission starting with the transaction after the last sequence number received by the destination node 12, if any. From this point on, neither the source node 12 nor the destination node 13 use the path where the problem occurred to receive a transaction or to send out an acknowledgement.

FIG. 3 illustrates an exemplary receive_seqid table 18 used with the system 10 of FIGS. 1 and 2. The table 18 comprises entries for each pending transaction. Each entry in the table comprises a sequence number (sequence ID) and a flag bit that is set to either one or zero. The sequence number includes the node identification of the transaction source node, the path, and the flow control class. The sequence number may be set to all zeros to indicate that a particular path is deconfigured. The flag bit may be set to zero to indicate that an acknowledgement has already been sent, or may be set to one to indicate that an acknowledgement still needs to be sent. The flag bit set to one may also indicate, in the case of a deconfigured path, the need to send a plunge request response. The send_seqid table 15 may be similar to the receive_seqid table 18 illustrated. Each mode in the computer system 10 may include a receive_seqid and a send_seqid table. Alternatively, separate data structures similar to that illustrated may be provided for each flow control class.

FIGS. 4–8 illustrate various operations of the system 10 shown in FIGS. 1 and 2. The operations described below assume that transactions are sent along one of the paths P1 or P2 from the source node 11 to the destination node 12, and that responses and acknowledgements are returned. The transactions may be in one or more flow control classes, and flow control class F will be used by way of example.

Figure 4:
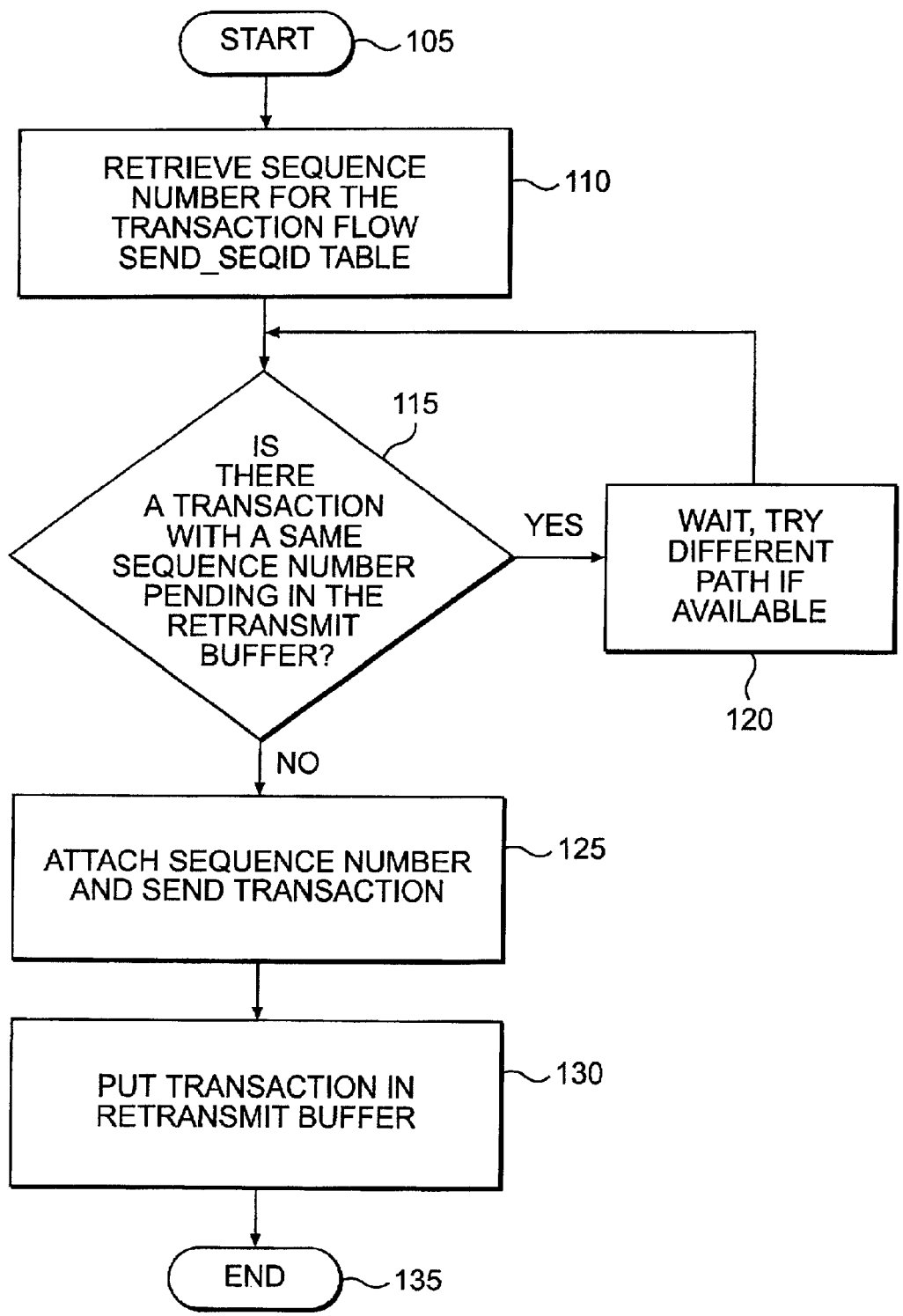
FIGS. 4–8 are flowcharts of operations of the apparatus of FIG. 1.

FIG. 4 shows the steps involved in an operation 100 for sending a regular, or normal, transaction in flow control class F, along path P2 from the source node 11 to the destination node 12. The operation 100 begins in block 105. In block 110, the destination node 11 retrieves a sequence number for a pending (designated) transaction from the send_seqid table 15. In block 115, the node 11 determines if the retransmit buffer 13 contains a transaction with the same sequence number as that retrieved in block 110, for a transaction to the destination node 12, using path P2, and flow control class F. Should the retransmit buffer 13 contain such a transaction, the operation moves to block 120, and the operation 100 waits for a time to allow the transaction in the retransmit buffer 13 to be cleared. Such a wait is necessary to avoid assigning a same sequence number to more than one transaction. Alternatively, the source node 11 may send the transaction to the destination node 12 along another available path, such as the path P1. Following an appropriate wait, or if another path is available, the operation 100 returns to block 115 to determine if the retransmit buffer 13 contains a pending transaction with the same sequence number, path and flow control class as the transaction designated in block 110.

In block 115, if the retransmit buffer 13 does not contain a transaction with the same sequence number, path and flow control class as the designated transaction, the operation 100 moves to block 125, and the retrieved sequence number is attached to the designated transaction. The designated transaction is then sent along the path P2 to the destination node 12. In block 130, the thus-sent designated transaction is placed in the retransmit buffer 13. In block 135, the operation 100 ends.

Figure 5:
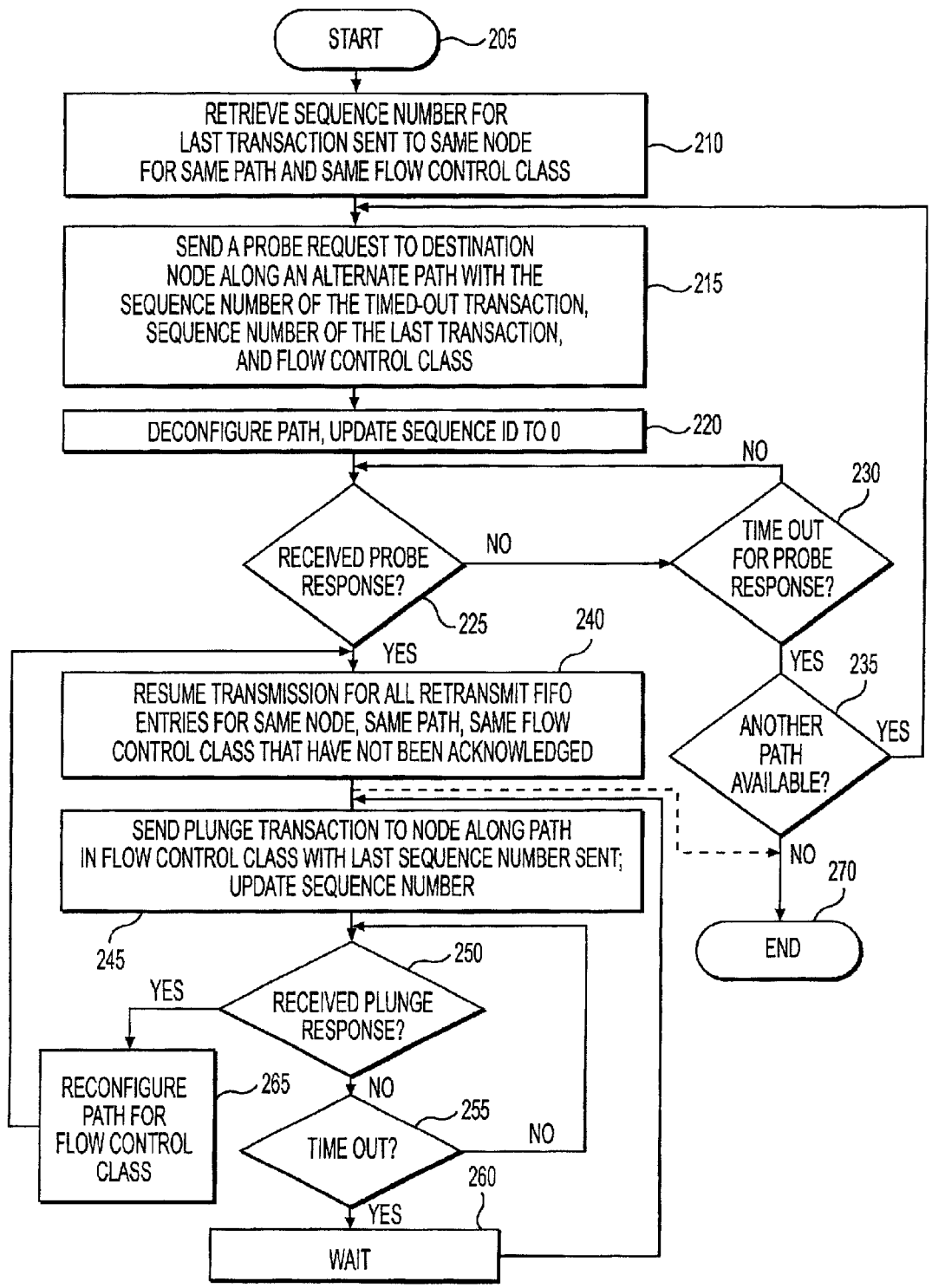

FIG. 5 illustrates an operation 200 that occurs when a transaction in the retransmit buffer 13 times out. The operation 200 begins in block 205, with a transaction that has timed out. In block 210, the source node 11 retrieves the sequence number of the last (most recent) transaction sent to the destination node 12 along the path P2 and the flow control class F as the transaction that timed out. For example, a transaction with a sequence number (ID) of 2 may have timed out, and the most recent transaction sent to the destination node 12 has a sequence number of 5 (both transactions 2 and 5 in the same flow control class, and sent along the same path). The source node 11 retrieves the sequence number 5. In block 215, the source node 11 sends a probe request transaction to the destination node 12 along alternate path P1 with the sequence number of the timed-out transaction and the sequence number of the last transaction sent, for the flow control class F. The source node 11 then deconfigures the path P2, block 220, for both sending transactions and receiving acknowledgments, updating the sequence number to 0. This step prevents using a path over which a timed-out transaction was to have been transmitted.

Once the probe request has been sent and the path deconfigured, the source node 11 waits to receive a probe response from the destination node 12. The wait can be established to account for a two-way transmission, plus some additional time in case of delays and tolerance errors. For example, the wait may be four times the design two-way transmission time. In block 225, the source node 11 determines if the probe response has been received. If the probe response has not been received, the source node 11 may determine if the probe response has timed out, block 230. If the probe response has not timed out, the operation 200 returns to block 225, and the source node 11 continues to wait for the probe response. If the probe response has timed out, the operation 200 moves to block 235, and the source node 11 determines if another path (for example a path P3) is available for sending the probe response to the destination node 12. If another path is available, the operation 200 returns to block 215. If another path is not available, then an error condition exists and the operation moves to block 270 and ends, indicating to management software that possible uncorrectable errors exist.

In block 225, if the source node 11 determines that the probe response has been received from the destination node 12, the operation 200 moves to block 240, and the source node 11 resumes transmission of all transactions in the retransmit buffer 13 for the destination node 12, along path P2 and flow control class F, for which the destination node 12 has not provided an acknowledgement.

At this point, the operation 200 may end as shown by the dashed line connecting blocks 240 and 270. Alternatively, the operation 200 may continue to block 245, and the source node 11 sends a plunge transaction to the destination node 12 along the path P2 in the flow control class F (that is, the plunge transaction follows the transaction corresponding to the last sequence number sent) indicating the sequence number where the source node 11 will begin transmission should the failed path P2 be re-established. The source node 11 next updates the sequence number in the send_seqid table 15. The source node 11 then waits for a response to the plunge transaction. Since the response to the plunge transaction may be in the same flow control class as the plunge transaction itself, the destination node 12 may simply use the flag bit in the receive_seqid table 18 to indicate when to send the plunge response if space does not exist in the receive buffer 17.

In block 250, the source node 11 determines if the plunge response has been received. If the plunge response has not been received, the source node 11 determines if the plunge transaction has timed out, block 255. If the plunge transaction has not timed out, the source node 11 continues to wait for the plunge response. If the plunge transaction has timed out, the source node 11 waits for either a software intervention to indicate that the path P2 is available, or may optionally wait for a longer time before sending another plunge response along the path P2, block 260. In block 250, if the source node 11 determines that the plunge response has been received, the operation 200 moves to block 265, and the source node 11 reconfigures the path P2 for normal transactions. The operation then returns to block 240, and any pending transactions in the retransmit buffer 13 for which an acknowledgement has not been received are sent to the destination node 12.

Figure 6:
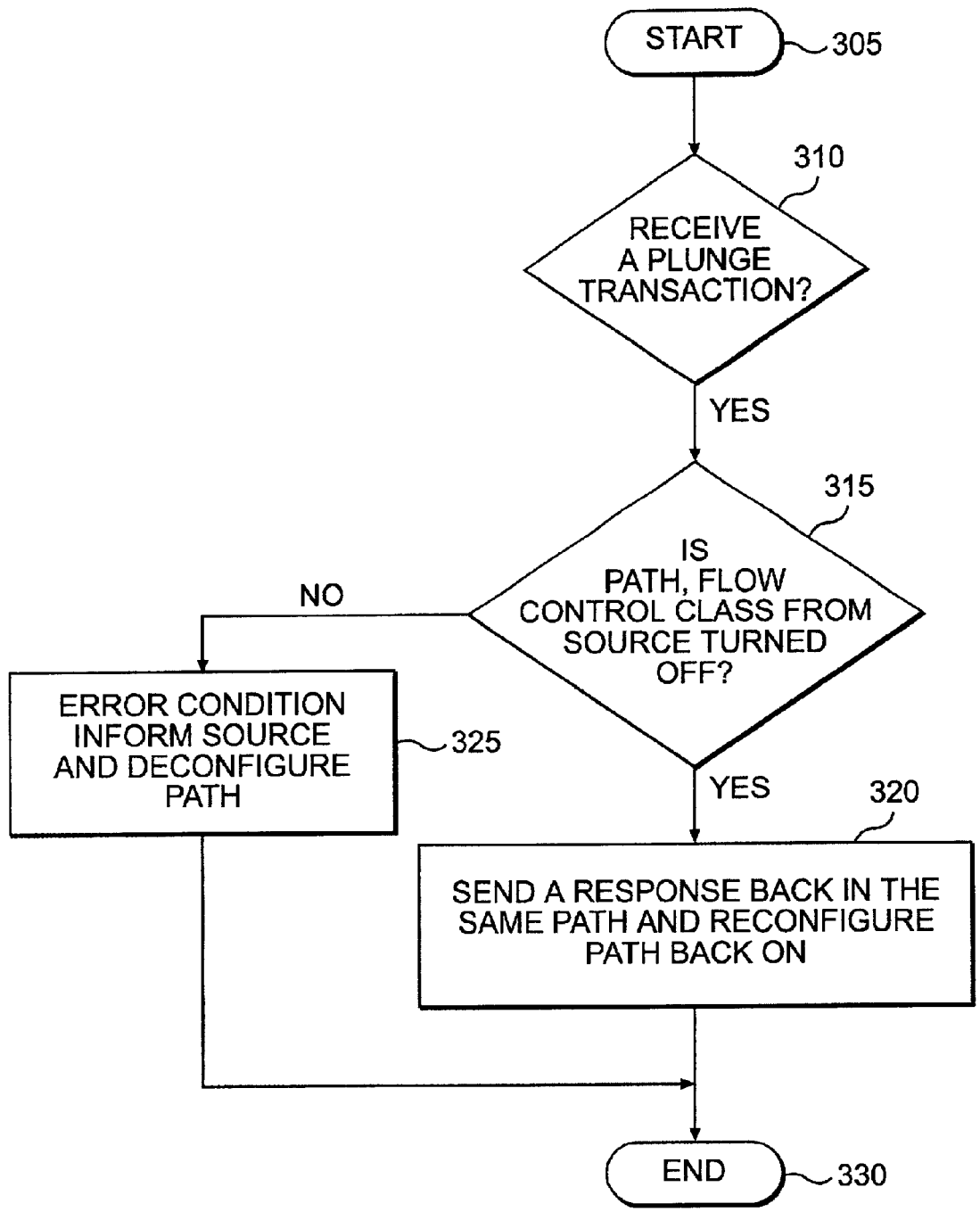

FIG. 6 is a flow chart of an operation 300 for at the destination node 12 for receiving and responding to a plunge transaction. The operation 300 begins in block 305. In block 310 the destination node 12 receives a plunge transaction. In block 315, the destination node 12 determines if the path and flow control class from the source node 11 is deconfigured (turned off). If the path and flow control class is deconfigured, the operation 300 moves to block 320 and the destination node 12 sends a plunge response back to the source node 11 along the same path the plunge transaction used. In block 320, if the destination node 12 cannot send a plunge response immediately (because, for example, the receive buffer 17 is full), the destination node 12 may use the flag bit in the receive_seqid table 18 to indicate when to send the plunge response to the source node 11. The destination node 12 then reconfigures the path P2 for sending and receiving normal transactions. The operation 300 then ends, block 330.

In block 315, if the path is not deconfigured, the operation 300 moves to block 325, and the destination node 12 notes an uncorrectable error, notifies the source node 11, and deconfigures the path P2. The operation 300 then ends, block 330.

Figure 7:
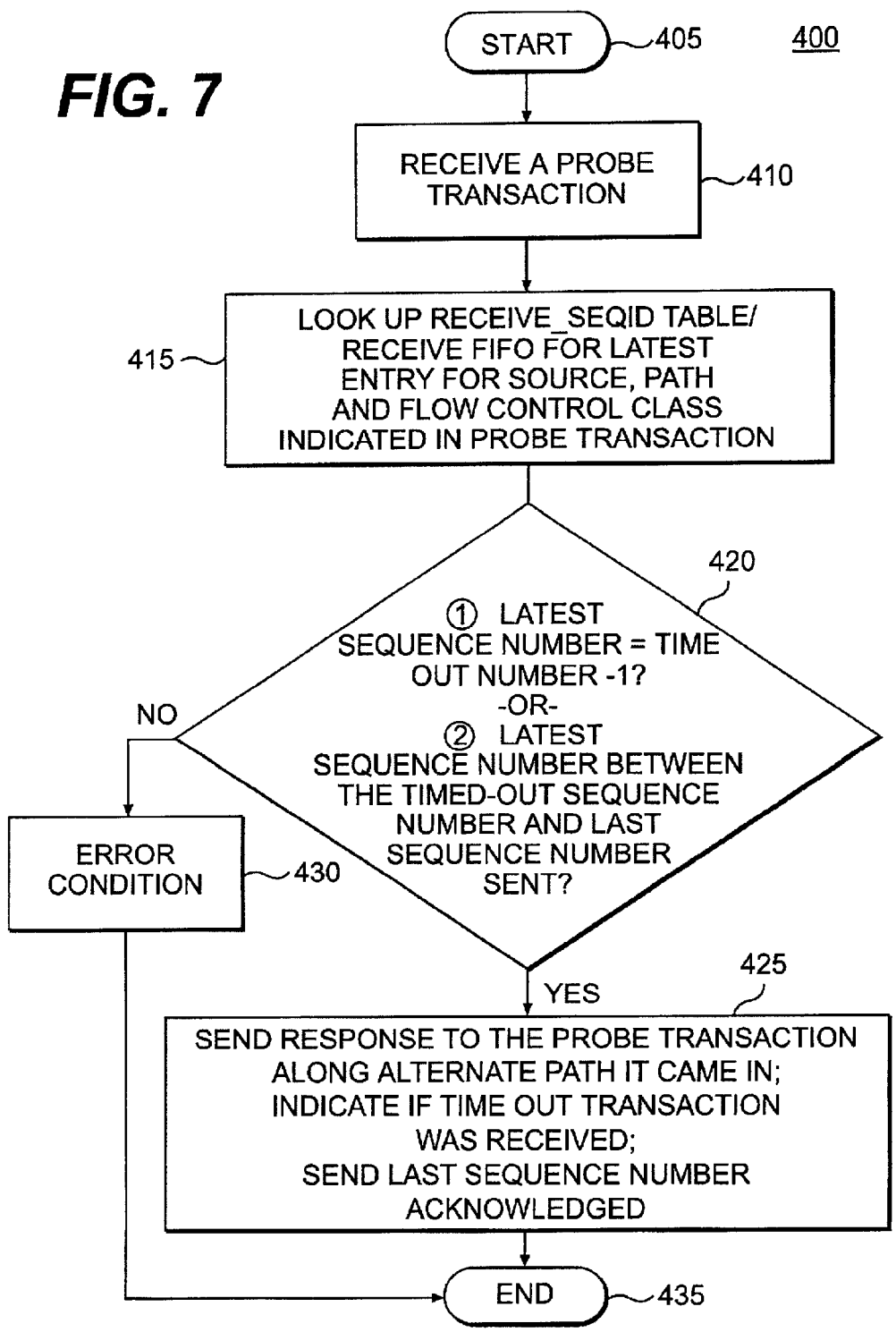

FIG. 7 is a flow chart illustrating an operation 400 at the destination node 12 for receiving and responding to a probe transaction. The operation 400 begins in block 405. In block 410, the destination node 12 receives a probe transaction from the source node 11. In block 415, the destination node 12 looks up the latest entry from the source node 11, for the path P2 and flow control class F, in the receive_seqid table 18 or the receive buffer 17. The operation 400 then moves to block 420, and the destination node 12 determines if either of the following two conditions is met: (1) the latest sequence number corresponds to the time-out sequence number, minus one; or (2) the latest sequence number lies between the timed-out sequence number and the last sequence number sent from the source node 11. If neither condition is met, the operation 400 moves to block 430, and an uncorrectable error condition is declared.

In block 420, if the destination node 12 determines that either condition is met, the operation 400 moves to block 425, and the destination node 12 sends a probe response along the alternate path (e.g., path P1) over which the probe transaction was transmitted. The destination node 12 also indicates if the timed-out transaction was received, and sends the source node 11 the sequence number of the last transaction acknowledged. Following blocks 425 and 430, the operation 400 ends, block 435.

Figure 8:
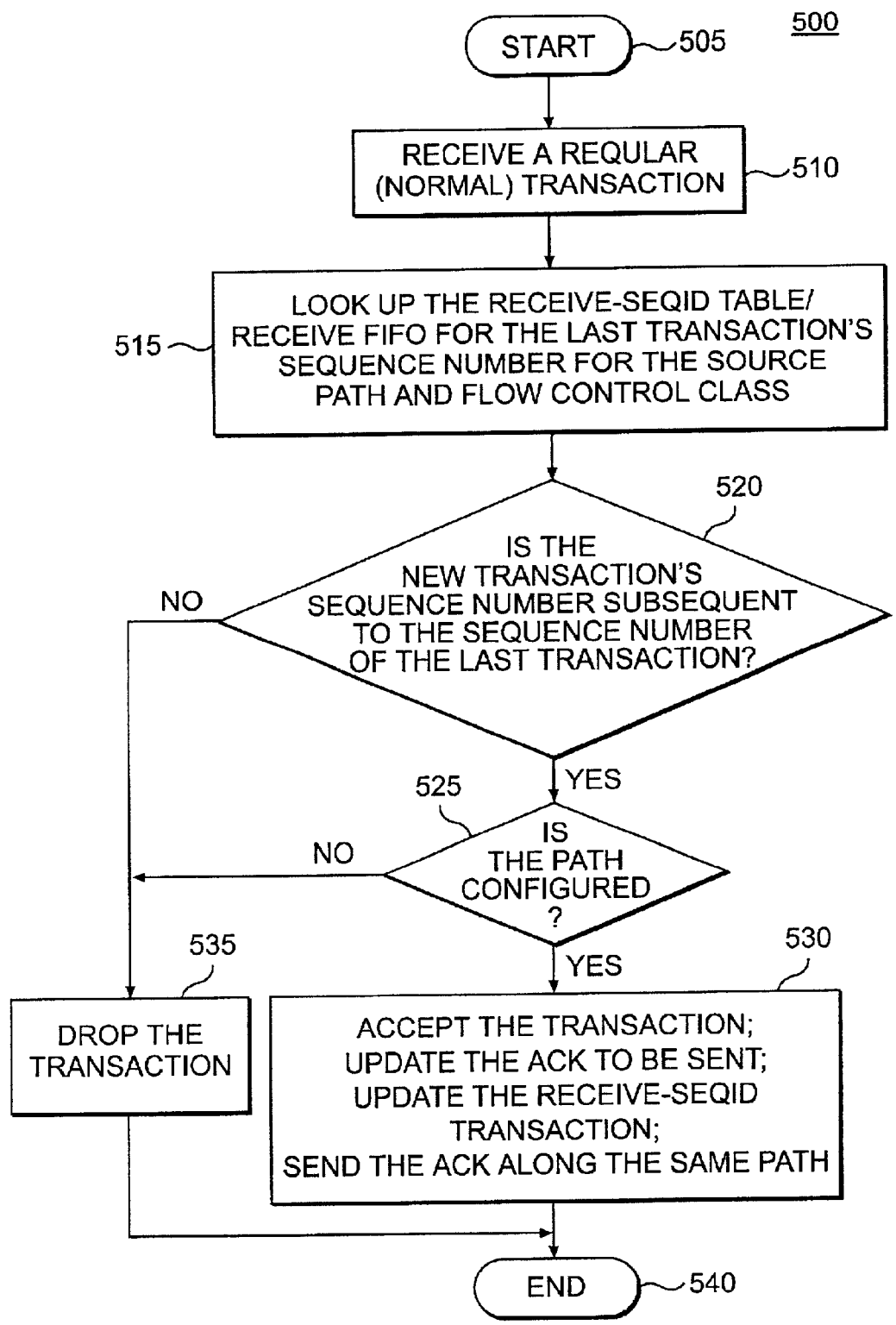

FIG. 8 is a flow chart showing a normal transaction operation 500 at the destination node 12. In the example illustrated, the source node 11 sends a normal transaction to the destination node 12 along the path P2 in flow control class F. The operation 500 begins in block 505. In block 510, the destination node 12 receives a normal (regular) transaction. In block 515, the destination node 12 looks up in the receive_seqid table 18/the receive buffer 17 the sequence number, path and flow control class for the last transaction received from the source node 11. In block 520, the destination node 12 determines if the sequence number for the newly received normal transaction is subsequent to the sequence number of the last transaction as determined in block 515. If the sequence number of the new transaction is subsequent to that of the last transaction, the operation 500 moves to block 525 and the destination node 12 determines if the path P2 is still configured. If the path P2 is still configured, the operation 500 moves to block 530, and the destination node 12 accepts the normal transaction. The destination node 12 then updates the acknowledgement to be sent, updates the receive_seqid table 18, and send the acknowledgement to the source node 11 along the path P2. If in either block 520 or 525, the condition is not met, the operation moves to block 535, and the transaction is dropped. The operation 500 then moves to block 540 and ends.

What is claimed is:

1. A method for retransmission of transactions in a multi-processor computer architecture, comprising:

at a source node in the computer architecture, the source node comprising a retransmit buffer, designating a transaction for transmission to a destination node in the computer architecture, the destination node comprising a receive buffer, wherein the transaction is designated for transmission over a first path in a first flow control class;

retrieving a sequence number for the designated transaction;

comparing the retrieved sequence number for the designated transaction to sequence numbers in the retransmit buffer, wherein if the comparison does not show a match:
 attaching the retrieved sequence number to the designated transaction,
 placing the designated transaction in the retransmit buffer, and
 sending the designated transaction to the destination node; and wherein if the comparison shows a match, transmitting the designated transaction over a second path.

2. The method of claim 1, wherein the designated transaction in the retransmit buffer times out, comprising:

retrieving the sequence number of a most recent transaction sent to the destination node along the first path;

sending a probe request to the destination node along the second path, the probe request including the sequence number of the timed-out transaction and the sequence number of the most recent transaction;

deconfiguring the first path; and updating the sequence number in the retransmit buffer.

3. The method of claim 2, wherein the destination node receives the probe request, the method at the destination node, comprising:

determining a sequence number for a most recent transaction entry in the receive buffer for a transaction from the source node along the first path and the first flow control class; and determining:
 (a) if the sequence number for the most recent transaction entry in the receive buffer equals the timed-out transaction sequence number minus one, and
 (b) if the sequence number for the most recent transaction entry in the receive buffer lies between the timed-out transaction sequence number and the sequence number of the last transaction sent by the source node.

4. The method of claim 3, wherein if either (a) or (b) are met:

sending a probe response to the source node along the second path;

indicating to the source node if the timed-out transaction is received at the destination node; and sending the source node the most recent sequence number acknowledged.

5. The method of claim 4, wherein the source node receives the probe response, comprising resuming transmission for all transactions in the retransmit buffer for which an acknowledgement has not been received.

6. The method of claim 2, wherein the probe request times out, comprising:

determining if a third path is available;

if the third path is available:

sending a second probe response along the third path, deconfiguring the second path, and updating the sequence number in the retransmit buffer; and if the third path is not available, designating an error condition.

7. The method of claim 3, wherein neither (a) nor (b) are met, and wherein an error condition is designated.

8. The method of claim 4, further comprising:

sending a plunge transaction to the destination node over the first path, the plunge transaction indicating a sequence number for retransmission of transactions should the first path be reconfigured; and updating the sequence number.

9. The method of claim 8, wherein the destination node receives the plunge transaction, the method at the destination node, comprising:

determining if the first path is deconfigured from the source node; and if the first path is deconfigured from the source node, sending a plunge response to the source node over the first path.

10. The method of claim 9, wherein the destination node determines that the first path is not deconfigured, wherein an error condition exists, comprising:

informing the source node; and deconfiguring the first path from the destination node.

11. The method of claim 9, further comprising:

receiving the plunge response; and reconfiguring the first path from the source node.

12. The method of claim 1, wherein the destination node receives the designated transaction, the method at the destination node, comprising:

determining from the receive buffer a sequence number from a most recent transaction from the source node along the first path in the first flow control class; and comparing the sequence numbers of the designated transaction and the most recent transaction.

13. The method of claim 12, wherein the sequence number of the designated transaction is subsequent to the sequence number of the most recent transaction, comprising, determining if the first path is configured.

14. The method of claim 13, wherein the first path is configured, comprising:

accepting the transaction;

updating a receive sequence number in the receive buffer; and sending an acknowledgement to the source node along the first path.

15. The method of claim 12, wherein the sequence number of the designated transaction is not subsequent to the sequence number of the most recent transaction, comprising dropping the transaction.

16. An apparatus for retransmission of transactions in a multi-processor computer architecture, comprising:

a source node having a retransmit buffer, wherein the source node stores transactions transmitted from the source node;

a send_seqid table comprising a sequence number for each transaction sent from the source node;

a destination node comprising a receive buffer, wherein the destination node stores transactions transmitted from the destination node;

a receive_seqid table comprising a sequence number for each transaction sent from the destination node, wherein the source node sends normal transactions to the destination node and the destination node sends acknowledgements for the normal transactions to the source node, wherein if the source node does not receive an acknowledgement within a specified time, a corresponding normal transaction in the retransmit buffer times out; and a probe transaction, whereby the source node queries the destination node for a timed-out transaction.

17. The apparatus of claim 16, wherein the probe transaction comprises a sequence number of the timed-out transaction and the sequence number of the most recent transaction sent from the source node to the destination node, wherein the source node comprises:

means for deconfiguring the first path; and means for updating the sequence number in the retransmit buffer.

18. The apparatus of claim 17, wherein the destination node receives the probe transaction, the destination node, further comprising:

means for determining a sequence number for a most recent transaction entry in the receive buffer for a transaction from the source node along the first path and the first flow control class; and means for determining:

(a) if the sequence number for the most recent transaction entry in the receive buffer equals the timed-out transaction sequence number minus one, and (b) if the sequence number for the most recent transaction entry in the receive buffer lies between the timed-out transaction sequence number and the sequence number of the last transaction sent by the source node.

19. The apparatus of claim 18, wherein if either (a) or (b) are met, the destination node:

sends a probe response to the source node along the second path;

indicates to the source node if the timed-out transaction is received at the destination node; and sends the source node the most recent sequence number acknowledged.

20. The apparatus of claim 19, wherein the source node receives the probe response, wherein the source node comprises means for resuming transmission for all transactions in the retransmit buffer for which an acknowledgement has not been received.

21. The apparatus of claim 18, wherein neither (a) nor (b) are met, and wherein an error condition is designated.

* * * * *